(12) United States Patent (10) Patent No.: US 7,839,803 B1
Snelgrove et al. (45) Date of Patent: Nov. 23, 2010

(54) METHOD AND SYSTEM OF TELECONFERENCING

(75) Inventors: William Martin Snelgrove, Toronto (CA); Michael Stumm, Toronto (CA); Mauricio De Simone, Toronto (CA)

(73) Assignee: Wireless Systems Technologies, Inc. (CA)

( * ) Notice: Subject to any disclaimer, the term of this patent is extended or adjusted under 35 U.S.C. 154(b) by 0 days.

(21) Appl. No.: 09/787,758

(22) PCT Filed: Sep. 24, 1999

(86) PCT No.: PCT/CA99/00875

§ 371 (c)(1), (2), (4) Date: Jun. 18, 2001

(87) PCT Pub. No.: WO00/19693

PCT Pub. Date: Apr. 6, 2000

(30) Foreign Application Priority Data

Mar. 4, 1999 (CA) .................................. 2264407

(51) Int. Cl.
*H04M 3/56* (2006.01)
*H04M 7/00* (2006.01)
*H04L 29/06* (2006.01)

(52) U.S. Cl. ..................... 370/260; 370/235; 370/261; 379/202; 379/205

(58) Field of Classification Search ......... 370/260–267, 370/230–235, 352–392, 400, 401; 379/158–202; 709/206–227
See application file for complete search history.

(56) References Cited

U.S. PATENT DOCUMENTS 4,399,531 A 8/1983 Grande et al. ............... 370/216

4,933,936 A 6/1990 Rasmussen et al. ......... 370/406
4,939,773 A 7/1990 Katz ........................... 379/204

(Continued)

FOREIGN PATENT DOCUMENTS

EP 0 448 073 A2 9/1991

(Continued)

OTHER PUBLICATIONS

U.S. Appl. No. 09/721,617, filed Nov. 27, 2000, Preiss.

(Continued)

*Primary Examiner*—M. Phan
(74) *Attorney, Agent, or Firm*—Katten Muchin Rosenman LLP

(57) ABSTRACT

A telecommunication system and method for communicating between at least two end users over a telecommunication network, where the communication is defined by a set of parameters. At least two entities, such as one or both of the end users and/or the service providers negotiate an agreed set of values for said parameters that define the desired communication. The entities also negotiate a warranty agreement with the network service provider defining at least one of the agreed parameters to be warranted including a compensation method to be applied should said at least one monitored parameter fail to meet the corresponding one of said agreed values. The agreed warranted parameters are monitored once the communication is established and, in the event of a failure of the monitored parameters to meet agreed values, at least one of the entities is compensated in accordance with the agreed compensation method. When more than two entities are involved in a communication, the compensation from an entity can be divided amongst the other entities according to an agreed scheme.

13 Claims, 4 Drawing Sheets

U.S. PATENT DOCUMENTS

| | | | | |
|---|---|---|---|---|
| 4,974,256 | A | | 11/1990 | Cyr et al. ............... 379/113 |
| 5,072,442 | A | * | 12/1991 | Todd ..................... 370/265 |
| 5,276,678 | A | * | 1/1994 | Hendrickson et al. ...... 370/267 |
| 5,384,772 | A | * | 1/1995 | Marshall ................. 370/235 |
| 5,473,363 | A | | 12/1995 | Ng et al. |
| 5,517,562 | A | | 5/1996 | McConnell .............. 379/207 |
| 5,581,610 | A | | 12/1996 | Hooshiari ............... 379/133 |
| 5,596,635 | A | | 1/1997 | Rao |
| 5,603,054 | A | | 2/1997 | Theimer et al. ............ 395/826 |
| 5,638,412 | A | | 6/1997 | Blakeney, II et al. ........ 375/377 |
| 5,668,854 | A | | 9/1997 | Minakami et al. ........ 379/88.18 |
| 5,674,003 | A | | 10/1997 | Andersen et al. ............ 709/228 |
| 5,699,352 | A | * | 12/1997 | Kriete et al. ............... 370/262 |
| 5,742,772 | A | | 4/1998 | Sreenan ................. 395/200.56 |
| 5,754,636 | A | | 5/1998 | Bayless et al. ............. 379/142 |
| 5,774,674 | A | | 6/1998 | Gutmann et al. ............ 709/237 |
| 5,793,762 | A | | 8/1998 | Penners et al. ............. 370/389 |
| 5,859,979 | A | | 1/1999 | Tung et al. ................. 709/228 |
| 5,898,772 | A | | 4/1999 | Connors et al. ............. 379/265 |
| 5,926,798 | A | | 7/1999 | Carter ........................ 705/26 |
| 5,999,563 | A | | 12/1999 | Polley et al. ................. 375/222 |
| 6,021,158 | A | | 2/2000 | Schurr et al. ................. 375/211 |
| 6,178,237 | B1 | * | 1/2001 | Horn ..................... 379/202.01 |
| 6,330,321 | B2 | * | 12/2001 | Detampel et al. ...... 379/205.01 |
| 6,463,038 | B1 | * | 10/2002 | Wilson ..................... 370/261 |
| 6,501,740 | B1 | * | 12/2002 | Sun et al. ................... 370/261 |
| 2002/0191550 | A1 | * | 12/2002 | Wilson ..................... 370/260 |
| 2003/0231600 | A1 | * | 12/2003 | Polomski ................... 370/263 |

FOREIGN PATENT DOCUMENTS

| | | |
|---|---|---|
| EP | 0 062 669 A1 | 10/1994 |
| EP | 0 680 190 | 11/1995 |
| EP | 0 716 386 | 6/1996 |
| EP | 0 859 500 A2 | 8/1998 |
| FR | 2 658 635 | 2/1991 |
| WO | WO 97/26750 | 7/1997 |
| WO | WO 97/35402 | 9/1997 |
| WO | WO 97/36430 | 10/1997 |
| WO | WO 98/19412 | 5/1998 |
| WO | WO 98/21871 | 5/1998 |
| WO | WO 98/37688 | 8/1998 |
| WO | WO 00/19663 | 4/2000 |
| WO | WO 00/19677 | 4/2000 |
| WO | WO 00/19691 | 4/2000 |
| WO | WO 00/19735 | 4/2000 |
| WO | WO 00/19736 | 4/2000 |

OTHER PUBLICATIONS

U.S. Appl. No. 09/722,003, filed Nov. 27, 2000, Snelgrove.

"Connection Establishment in High-Speed Networks", Scott Jordan and Hong Jiang, IEEE Journal on Selected Areas in Communications, vol. 13, No. 7, Sep. 1995.

"A New Approach to Service Provisioning in ATM Networks", S.H. Low and P.P. Varaiya, IEEE Transactions on Networking, vol. 1, pp, 547-553, 1993.

"Connection Establishment Protocol Based on Mutual Selection by Users and Network Providers", Nagao Ogino, ACM, 1998.

"Challenges for nomadic computing: Mobility management and wireless communications", Thomas F. LaPorta et al., Mobile Networks and Applications 1 (1996), pp. 3-16, 1996.

"A distributed control strategy for wireless ATM networks", M. Veeraraghavan et al, Wireless Networks 1 (1995), pp. 323-339, 1995.

"Control Point Systems Products and Services", Control Point Systems Inc., http://www.controlpoint.org/products.htm, Feb. 10, 1999.

"New Lucent software allows Internet telephony providers to offer ubiquitous, seamless telephone service", Lucent Technologies, http://www.lucent.com/press/0998/980917.bla.html, Sep. 17, 1998.

"Enabling the Promise of Next Generation Converged Networks", Lucent Technologies, http://www.lucent.com/IN/softswitch.html, 1999.

"Lucent Technologies unveils next-generation IP business systems that converge voice and data over local and wide area networks", Lucent Technologies, http://www.lucent.com/press/1098/981021.bca.html, Oct. 21, 1998.

"Vendors Raise Voice Over IP", Chuck Moozakis, http://www.internetwk.com/news1098/news102398-3.htm, Oct. 23, 1998.

"An Insurgence of Convergence At N+1", Kim Borg, http://www.westworldproductions.com/archive/1998/1198ctr/5897.htm, Nov. 1998.

"Distributed Pricing for Embedded ATM Networks", J. Murphy et al., http://www.eeng.dcu.ie/~murphyj/dist-price.html, Jun. 8, 1995.

"Mobile Service Agents Enabling 'Intelligence on Demand' In Telecommunications", S. Krause et al., 1996 IEEE Global Telecommunications Conference (Globecom 96), vol. 1, pp. 78-84.

* cited by examiner

METHOD AND SYSTEM OF TELECONFERENCING

FIELD OF INVENTION

The present invention relates generally to telecommunications, and more specifically, to a system and method of teleconferencing.

BACKGROUND OF THE INVENTION

Teleconferencing systems allow people at different locations to converse as if they were in the same room. In spite of the current high cost and complexity of these systems, they are commonly used for business applications, because of the resulting reductions in travel time and cost. However, the cost and complexity can not generally be rationalized in other applications such as academia and private use, so teleconferencing is not common in these areas.

Traditional teleconferencing systems consisted of single microphone and monophonic speaker arrangements at each physical location participating in the teleconference, and the methodology was to broadcast the loudest voice to all other participants, blocking the remainder of the voices. However, the art has been evolving and systems are now available which offer such added features as video signals of the participants and stereo sound. Generally though, these new features present even greater demands on the carrier networks in terms of higher bandwidth and lower latency, which results in even higher cost and complexity. This largely explains the limited availability and use of such advanced teleconferencing systems.

Generally, each teleconferencing system is designed to be used with a specific communication network. Presently, two communication networks are dominant: the public switched telephone network for voice, and the Internet for data. These systems are typically composed of terminal equipment such as telephones or personal computers, an access network such as a telephony local loop or a radio link, and a backbone network such as the public switched telephone network (PSTN) or the intercity data networks. Although the needs of users at the terminals vary greatly, the backbone networks require highly standardized loads in order to operate reliably and efficiently. Therefore, traditional communication networks focused on the provision of single services rather than differentiation. There is no incentive for telephone companies to offer varied features or to serve small niche markets as the revenues would not offset the substantial cost of developing and implementing these additional products.

In voice telephony, services are implemented by having large computer programs running on centralized switches which interrogate local and distributed databases. The local databases specify which features are enabled on a given line, the switch software interprets these feature lists and implements the switch behaviour, and the switch software also interrogates the distributed databases via Common Channel Signalling System No. 7 (SS7) queries. SS7 is a global standard for telecommunications that defines the procedures and protocol by which network elements in the public switched telephone network (PSTN) intercommunicate control messages for basic call setup, management, and tear down, as well as for special intelligent or database services such as local number portability (LNP), toll-free (800/888) services and call forwarding.

In PSTN, a user only has access to services provided by the local exchange carrier, which in turn may only function within the bounds of the SS7 protocol. Therefore, users can only access the switches in a limited way, and new features can not be added by outside parties.

Telephony features, such as teleconferencing, may only be implemented by adding code to the programs running the switches or by adding specialized hardware to the telephony network. The features available to particular users are defined in the local databases accessed by the switch software, and adding a new type of feature may involve changing these databases together with the switch software that uses them, and may also involve purchasing and installing new types of hardware in the network.

This limits the speed with which new features can be introduced since new hardware and software must be designed, tested, manufactured and deployed. The inflexible assignment of tasks also makes it impossible to share loads between different types of hardware, for example to use idle tone-decoding hardware to help with an overload of voice-conferencing or to provision a new teleconferencing feature.

A traditional PSTN teleconferencing system provides each user with a bidirectional audio communication link with each of a plurality of remote transceivers. Typically, the system includes a microphone at each location for producing an audio signal from that location and a transport network such as the public switched telephone network (PSTN) which deliveries each voice signal to a conference bridge. This conference bridge mixes the voice signals and returns them to audio amplifiers and speakers at each location.

The conference bridge is implemented as a new hardware component connected to the switch providing the service. Adding a new feature such as Dolby™ noise reduction or bass boosting requires a physical change to the hardware and/or software in every switch that offers the service.

Changes to existing telecommunication networks are therefore very complicated to make. There is a rigid model and hardware structure which is difficult to extend, so existing telephone companies are forced to focus on broad services. When they do develop new products, they inevitably take a long time to bring to market and are expensive to implement.

Telecommunications systems need to process the data flowing through themselves in complex ways, often with processing occurring on computer systems separated both geographically and administratively. Many communications paths are simultaneously active, and the processing applied to the various flows of data changes frequently and in a wide variety of ways. The software needed to control these computer systems is generally large, complex and difficult to change.

The complexity of present telecommunications systems software, and the extensive interactions between its software components, makes the development of new features very difficult. As well, telecommunication services have traditionally been provided by large monopolies who employed proprietary equipment that only they had access to. Large telephone companies hesitate to allow open access to the control of their switches and servers due to the risk of failures and the resulting damages that would occur; therefore, only very limited access is allowed.

Software development for telephone companies is therefore limited to a "closed" group of trusted developers, which reduces the talent pool available and shuts out developers with new ideas for niche markets.

In summary, problems with the PSTN include:

1. system complexity results in long time to bring new products to market;

2. cost of services results in focus on few specific services rather than diversity and niche markets;

3. existing services are provided by dedicated hardware and software which are inflexible and must be physically, and often manually, modified to offer new services or features; and 4. only proprietary access to switches and their software code is allowed.

The implementation of software applications in an Internet environment is generally done by the software running at the endpoints, and the IP (Internet Protocol) network is treated merely as a conduit for transfer of data packets between the two points. The routers in the IP network merely index internal routing tables using the address of data packets so that they know how to forward them, and do not generate data for either of the endpoints, or react to instructions from either of the endpoints. The Internet itself may be envisioned as a series of routers interconnected by an Internet backbone network designed for high-speed transport of large amounts of data. Users may access the Internet using personal computers in a number of manners including modems connected to the Public Switched Telephone Network (PSTN), or set top boxes connected to existing telephone or television cable networks.

Communications over the Internet can be administered using various protocols, over a variety of physical transfer media. A protocol is a set of conventions or rules that govern transfer of data between hardware devices. The simplest protocols define only a hardware configuration while more complex protocols define data formats, error detection and correction techniques and software structures.

The key advantages of a protocol like IP are that it allows a large network to function efficiently and that it offers a standardized means by which applications software can use that network. The main disadvantages are:

1. that it does not allow processing to be performed on data streams; and 2. that it does not allow quality of service to be specified.

For example, the Internet generally will not let a user run an applet on a node or server. This limitation is due to the architecture of the Internet which is based on the international OSI (Open Systems Interconnection) standard. The OSI standard describes communication systems using a seven layer model, each layer being operable to perform certain functions. Although OSI is not always strictly adhered to in terms of keeping related functions together in a well-defined layer, most telecommunication products make an attempt to place themselves in relation to the OSI model. The OSI standard is not likely to change dramatically, nor is the Internet's use of the standard, so the Internet will not likely become an active component in the provision of telecommunication services.

More importantly, the Internet does not allow quality of service to be specified. Internet communications generally rely on the transport of data packets over various heterogenous networks, so even though certain links may have predictable data rates, for example, a privately owned T1 line, total end to end transfer rate is still not predictable or dependable.

Some protocols such as resource reservation protocol (RSVP) set tags and priorities which can influence the routers on an Internet path a little, but not a great deal. The RSVP is an extension to IP that permits specification of quality of service at a technical level, in terms of parameters such as data rates and latencies. It has had limited acceptance due to the complexity it adds to backbone networks and the need for their switching hardware to be updated. As well, little is accomplished unless all switches in the end to end connection are responsive to the protocol, which is not generally the case.

Therefore, typical software applications operating over the Internet, such as teleconferencing, look at the Internet as simply a transport network without any processing capability and all functionality is placed at the participant's locations. Implementations of teleconferencing over Internet, for example, have software at each user's personal computer (PC) that acts as the interface with the user, converting voice to data packets for IP transmission to each of the other participants in the teleconference. Accordingly, the user's PC also receives streams of voice data from each of the other participants in the teleconference and plays them through a sound card.

This implementation suffers from severe scalability problems. For example, if there are ten participants in a teleconference, then each participant would require sufficient bandwidth to download nine simultaneous voice data streams from the other participants, in real time. As the bandwidth to each user would increase linearly with the number of participants, and the load on the network increase with the square of the number of participants, there would be an immense load on the network resources. Clearly, this is impractical for teleconferences with a large number of parties or services which themselves require high bandwidth such as video or high quality voice. Even if the bandwidth could be obtained, there is no way to ensure that it is consistently available, as there is no way to specify quality of service (QoS) in Internet applications.

As noted above, typically, each existing teleconferencing system is designed to operate over a particular network and is not capable of cooperating with the many varied networks now available. These networks include public switched telephone network (PSTN), Internet, cellular telephone systems, satellite communications, local area networks (LANs) and wide area networks (WANs). Within these networks there are a variety of media including optical fibre, wireless or hardwired electrical connections, which execute communications over these networks in analogue or digital format using a variety of different protocols. Many of these networks have been widely implemented, at considerable capital cost, so it is unlikely that they will be quickly abandoned and a new, standard, world-wide telecommunications network constructed. Therefore, there is a need for a system which is capable of implementing teleconferencing over a mixed combination of communications networks.

Asynchronous Transfer Mode (ATM) networks, for example, use standard protocols for addressing packets of data and setting up connections, and have typically been deployed in the core of backbone networks because of the high speeds at which ATM equipment operates. Because ATM routers are not directly accessible and because of the complexity of their mechanisms for describing QoS, these mechanisms have not been used by applications software.

Besides the IP and ATM networks mentioned above, there are other data networks such as Frame Relay and Ethernet. As well, the PSTN may also be used to carry data, for example using trellis coding which maps digital data onto an analogue signal and which is commonly used by Personal Computer modems. Variants are also evolving of each major type of network, and engineering differences between implementations of these networks result in different performance. The complexity induced by this variety makes it difficult for users and application software to exploit all the networks available, and to exploit any to its fullest extent.

Feature development is already difficult for the simple application of teleconferencing over voice networks. As new media such as videophone, typed messaging, shared files and whiteboards are mixed with traditional teleconferencing products, and new applications such as distance learning, Internet Relay Chat and Internet gaming, develop, the problem is becoming even more severe. This problem will grow even greater as expectations develop for features from one domain to be mapped into another, as when customers expect a feature similar to call-waiting to apply in videoconferencing or Internet gaming.

Furthermore, even for a single application, different users may have different needs, for example, requiring different degrees or forms of encryption. Therefore, there is a need for a system which can allow many cases and features without becoming complex, slow to develop and slow in operation.

U.S. Pat. No. 5,473,363 to Ng et al. teaches a teleconferencing system for connection-based (PSTN) networks. This system has multipoint control units (MCUs), each of which can service one or more users, which are chained together to reduce delays introduced by mixing the voice signals. Each MCU receives signals that have been selected and mixed by adjacent MCUs, according to a defined mixing protocol, and signals from its users. Each MCU then mixes the signals from its users with the received mixed signals from adjacent MCUs, according to the defined mixing protocol, and outputs a mixed signal to its adjacent MCUs. Thus, only the signals from some users (typically the loudest speaking) are forwarded through connections in the network.

There is therefore a need for a method and system of teleconferencing that may be implemented over mixed telecommunications networks, and addresses the complexity of such existing networks to provide an open, scalable and flexible architecture and which can forward signals from all other users to each user.

SUMMARY OF THE INVENTION

It is therefore an object of the invention to provide a method and system of teleconferencing which addresses the problems described above, at least in part.

One aspect of the invention is broadly defined as a system for teleconferencing comprising: three or more user terminals, each having an audio input and an audio output; a telecommunications network interconnecting the user terminals and operable to transport data to and from the user terminals; separate modular mixing software for each respective user terminal, executing on the telecommunications network, and operable: to receive separate audio signals from the audio outputs of the others of the user terminals; and to combine the separate audio signals into a signal for the audio input of the respective user terminal which correlates to the needs of the respective user terminal.

Another aspect of the invention is defined as: a server for teleconferencing comprising: means for interconnecting user terminals and transporting data to and from the user terminals; means for executing separate modular mixing software for each respective user terminal, the separate modular mixing software including: means for receiving separate audio signals from the audio outputs of the others of the user terminals; and means for combining the separate audio signals into a signal for the audio input of the respective user terminal which correlates to the needs of the respective user terminal.

An additional aspect of the invention is defined as: a method of teleconferencing comprising the steps of: receiving, at a separate modular mixer representing a respective one of three or more user terminals and executing on a telecommunications network, separate audio signals from audio outputs of the others of the user terminals; and combining the separate audio signals into a signal for an audio input of the respective user terminal which correlates to the needs of the respective user terminal.

A further aspect of the invention is defined as: a computer data signal embodied in a carrier wave, said computer data signal comprising a set of machine executable code being executable by a computer to perform the steps of: receiving, at a separate modular mixer representing a respective one of three or more user terminals and executing on a telecommunications network, separate audio signals from audio outputs of the others of the user terminals; and combining the separate audio signals into a signal for an audio input of the respective user terminal which correlates to the needs of the respective user terminal.

A still further aspect of the invention is defined as: a computer readable storage medium storing a set of machine executable code, the set of machine executable code being executable by a computer server to perform the steps of: receiving, at a separate modular mixer representing a respective one of three or more user terminals and executing on a telecommunications network, separate audio signals from audio outputs of the others of the user terminals; and combining the separate audio signals into a signal for an audio input of the respective user terminal which correlates to the needs of the respective user terminal.

BRIEF DESCRIPTION OF THE DRAWINGS

These and other features of the invention will become more apparent from the following description in which reference is made to the appended drawings in which.

DETAILED DESCRIPTION OF PREFERRED EMBODIMENTS OF THE INVENTION

Figure 1:
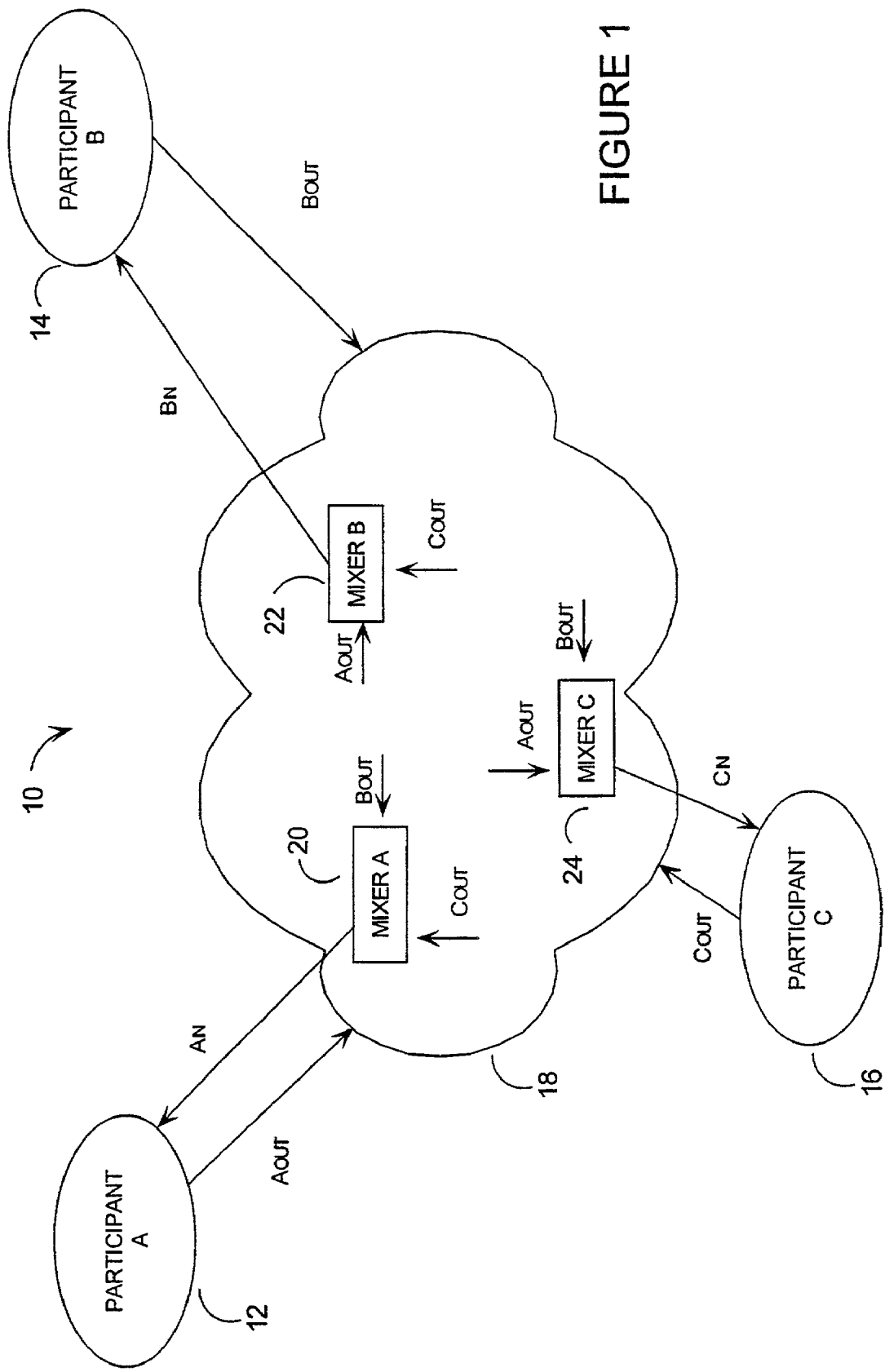
FIG. 1 presents a physical layout of a teleconferencing system in a broad manner of the invention.

A system which addresses the objects outlined above, is presented as a physical layout in FIG. 1. This figure presents a system 10 for teleconferencing between three or more user terminals 12, 14, 16, each having an audio input and an audio output. The phrase "terminal" is used generally in the art to describe any suitable manner of user audio input and output device including telephones, cellular telephones, and personal computers with microphones and speakers or headsets. The audio input and output refer to the connections between the terminal and the telecommunications network, and not to the audio interface between the user and the terminal.

A telecommunications network 18 interconnects these user terminals 12, 14, 16 and has the necessary functionality to transport data packets between them. The telecommunications network 18 also executes separate modular mixing software for each respective user terminal 12, 14, 16. These separate mixers 20, 22, 24 are operable to receive separate audio signals from each of the other user terminals and to combine those separate audio signals into one signal. This one mixed signal is transported to the audio input of the respective user terminal, in a manner that correlates with the needs of that respective user terminal.

That is, if there were three participants in the teleconference, there would be three mixers, a first mixer for participant A, which mixes the audio output signals of participants B and C, a second mixer for participant B, which mixes A and C, and a third mixer for participant C, which mixes A and B.

The use of individual mixers 20, 22, 24 executing on the telecommunications network 18 addresses a number of the problems noted above.

Firstly, having individual mixers 20, 22, 24 allows each mixer to be dedicated to its own user and to be tailored to the limitations of the user's resources and the resources of the network and network connection that services that user. For example, the mixer of a user having a high bandwidth connection may provide digital quality stereo to its user, with balanced mixing of all participant's voices. Another user connection via an analogue, monophonic, PSTN connection may send only the strongest voice to its user, blocking voice signals from other participants and thereby reducing noise.

Having a single mixer for all participants, as taught in the PSTN art, would require an immense piece of software code if all of the variations in user requirements were to be handled in a single piece of software. As this piece of software code would be unmanageably large, complex and slow, existing systems have simply not offered such diverse services.

Similarly, the use of mixers 20, 22, 24 executing on the telecommunications network 18 offers a substantial improvement over existing Internet based teleconferencing as well. Typically, Internet methods broadcast all voice streams to all participants' terminals, so each terminal receives up to (N−1) streams where there are N participants. This places a tremendous demand on the bandwidth of the final connection to each user and a tremendous load on the network. In contrast, the invention requires only the number of audio channels that the user requires at his audio output, to be sent to the user's terminal. That is, if the user desires monophonic output, only one channel is required, and if stereo is desired, two channels. Quadraphonic sound, surround sound, central bass and other audio arrangements would require corresponding numbers of audio channels. This greatly reduces the bandwidth required to each user and the loading on the network.

Thirdly, it is also significant that the mixers of the invention are implemented in a modular manner. As will be described in greater detail hereinafter, all of the software components of the invention are implemented in small modules. Having small modules designed to handle very specific tasks results in a far simpler system than those like the existing PSTN. The more defined the task that a module addresses, the easier it is to design that module and later, to integrate it into the rest of the software system. This is fundamental to the provision of a system that is flexible and open.

Other advantages of the invention will become more apparent from the description of the preferred embodiment which will be presented in terms of an example.

Figure 2:
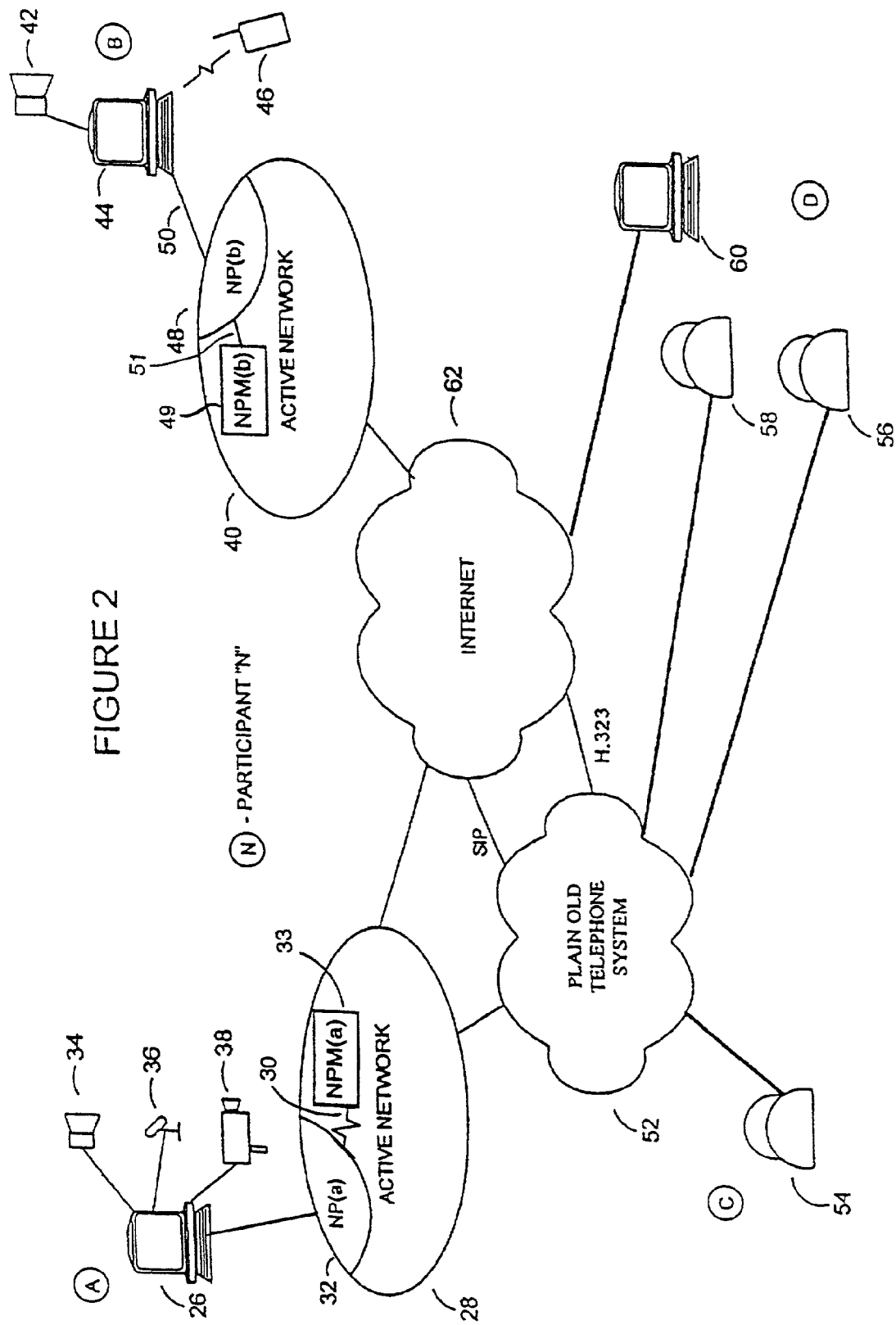
FIG. 2 presents an exemplary physical layout of a teleconference system in a preferred embodiment of the invention.

FIG. 2 presents an exemplary physical layout of a teleconference in the preferred embodiment of the invention, having four participants. Two participants have direct access to an active network, while two are connected to the PSTN. The term "active network" refers to a network that is operable to execute the mixer software and other related software components described hereinafter.

Participant A has a personal computer (PC) 26 connected to a first active network 28. The entity on the active network 28 which serves Participant A is called a NetPort 32 which cooperates with a Netport Manager 33. The specific role of the NetPort 32 and NetPort Manager 33 within the active network 28 will be described in greater detail hereinafter. NetPort 32 communicates with NetPort Manager 33 and the balance of Active Network 28 via a wireless link 30. The PC 26 is running a stereo-enabled Web browser with a RealAudio plugin that implements streaming audio and is output at speaker 34. The PC 26 also has a simple microphone plugin that passes samples from the on-board microphone 36 back to an IP address. Participant A also has a WebCam 38 connected to her PC 26.

Participant B is connected directly to a second active network 40, but in a location geographically remote from the first active network 28. Participant B also listens to a speaker 42 connected to his PC 44 through a streaming-audio application, but is talking through a wireless telephone 46. Participant B is plugged into a second NetPort 48 through a hardwired connection 50 and NetPort 48 communicates with NetPort Manager 49 through a wired link 51.

Participant C is connected to the POTS 52 (plain old telephone system) via a rotary-dial telephone 54.

Participant D has two speaker phones 56, 58 fed by two separate POTS lines. He also has an Internet connection via a PC 60 which runs a Web browser, but his Internet Service Provider (ISP) does not provide good enough quality of service (QoS) for voice, so he just uses it for the graphic user interface (GUI).

A GUI is piece of software that presents data to users in a graphical manner, allowing for easy interpretation and modification. It is preferred that the invention be implemented in such a manner, where possible. The GUI runs as Java in the PC browser, and communicates with call processing applications running on the active network by means of sockets. Invoking it involves typing a URL (uniform resource locator such as "coolPhones.com"), after which it sits in a window waiting for an incoming call or a user input event to place a call. Inputs can be made via a mouse, keyboard, trackball, touchscreen, joystick or other similar manner. The GUI is strictly an interface, though, since it is unacceptable, for example, to have voice-mail fail when the PC is not active. Therefore, the real call processing decisions are made on the active network side.

This exemplary system also includes an Internet network 62, which is connected to the PSTN using, for example, H.323 and SIP (Session Initiation Protocol) connections. These connections are known in the art, as are others. The Internet network 62 is also shown to be connected to both active networks 28, 40, but many other system topographies are also possible. The invention is not limited by any particular topography.

While the teleconference is in progress, Participant A hears Participant B on the left, Participant C in the middle and Participant D on the right, because Participant A is mixing the other participants' monophonic voice streams into a synthesized stereo spectrum. The use of the stereo output has two major advantages. Firstly, it aids in identifying which participant is currently speaking. Secondly, it allows higher noise levels to be tolerable to participants due to the "cocktail party" effect. This effect acknowledges that people are able to converse comfortably with one another in an environment where there is considerable background noise, provided that they have a means for identifying and focussing their attention on a particular speaker. The use of stereo sound has been shown to provide this identification.

Stereo sound can be synthesized in a number of manners. In a simple implementation, amplifier gain can be varied between the left and right channels, for example: one participant may be played at full volume on the left channel and none at all on the right, a second may be played with full volume on the right channel and none on the left, while a participant may be played at equal volume in both channels. More complex implementation of stereo may, for example, introduce a delay to the audio signal before playing it on one of the channels, simulating the additional time the sound takes to travel to the farther of the listener's two ears in a regular physical environment. Such methods are generally known to those skilled in the art.

Accordingly, Participant A's GUI screen shows a Web page with Participant B's picture on the left, Participant C's number in the middle and Participant D's caller-ID name on the right. In each case, the GUI displays the best identification information that it has available for each participant. This identification may include a URL or telephone number. As well, "screen-pop" information could be provided which identifies personal information about the participant such as his address.

As well, via the GUI, Participant A can click on "ear" and "eye" icons for each of the three participants on her screen to enable or disable their ability to hear her or to see her through the WebCam. Participant A can also drag on a "mouth" icon to set the volume level at which they speak to her, and drag participants left and right to adjust their stereo imaging. Alternatively, the volume level of participants could be governed by their physical location on the GUI display—the further a participant's icon is away from an icon representing the user, the lower their volume level. Another preferred feature of the GUI is that when someone speaks, their icon becomes brighter then gradually fades again with inactivity.

Similarly, Participant B hears Participants A, D and C in a synthesized stereo spectrum from left to right. Because he finds the sound of participant A's voice similar to that of Participant C, he has chosen to separate them spatially as much as possible. This is done with the same type of GUI described with respect to Participant A above.

Participant C hears a conventional four-way conference call, with the voices of the three other Participants companded and mixed together. As a result, she has difficulty distinguishing Participants B and D. However, she has the flexibility to tailor the call to some extent with the preference for single voice dominating, adding noise filters, or other functionality preferably via her proxy. This addition of functionality directly to PSTN customers is very desirable. As explained in the background, PSTN services are driven by a supply model that only provides commodity services, and takes a long time to provide those limited services. There is a vast PSTN infrastructure which provides single monophonic lines into millions of homes and businesses, all of which are shackled with these limitations. The use of proxies in the manner of the invention provides greater flexibility and access to new services which may be implemented quickly and at very low cost. More details are provided hereinafter regarding the preferred use of proxies.

Participants who do not have the capability of interacting with the active network will have generic proxies assigned to them which are dictated by the nature of their telecommunication connections. For example, the system knows that a Participant only has PSTN access if that is the connection the call manager has identified as the best connection during call setup.

Participant D has a similar stereo arrangement, over which he has defined Participant A to reside on the left speaker telephone, Participant D on the right speaker telephone and Participant C on both channels. This arrangement also creates a synthesized stereo spectrum. Other means are known in the art for carrying stereo over the PSTN, but such methods generally require more complicated hardware at the Participant's end. Participant D has the same GUI as Participants A and B so he is able to control his proxy and mixer on the active network directly.

Figure 3:
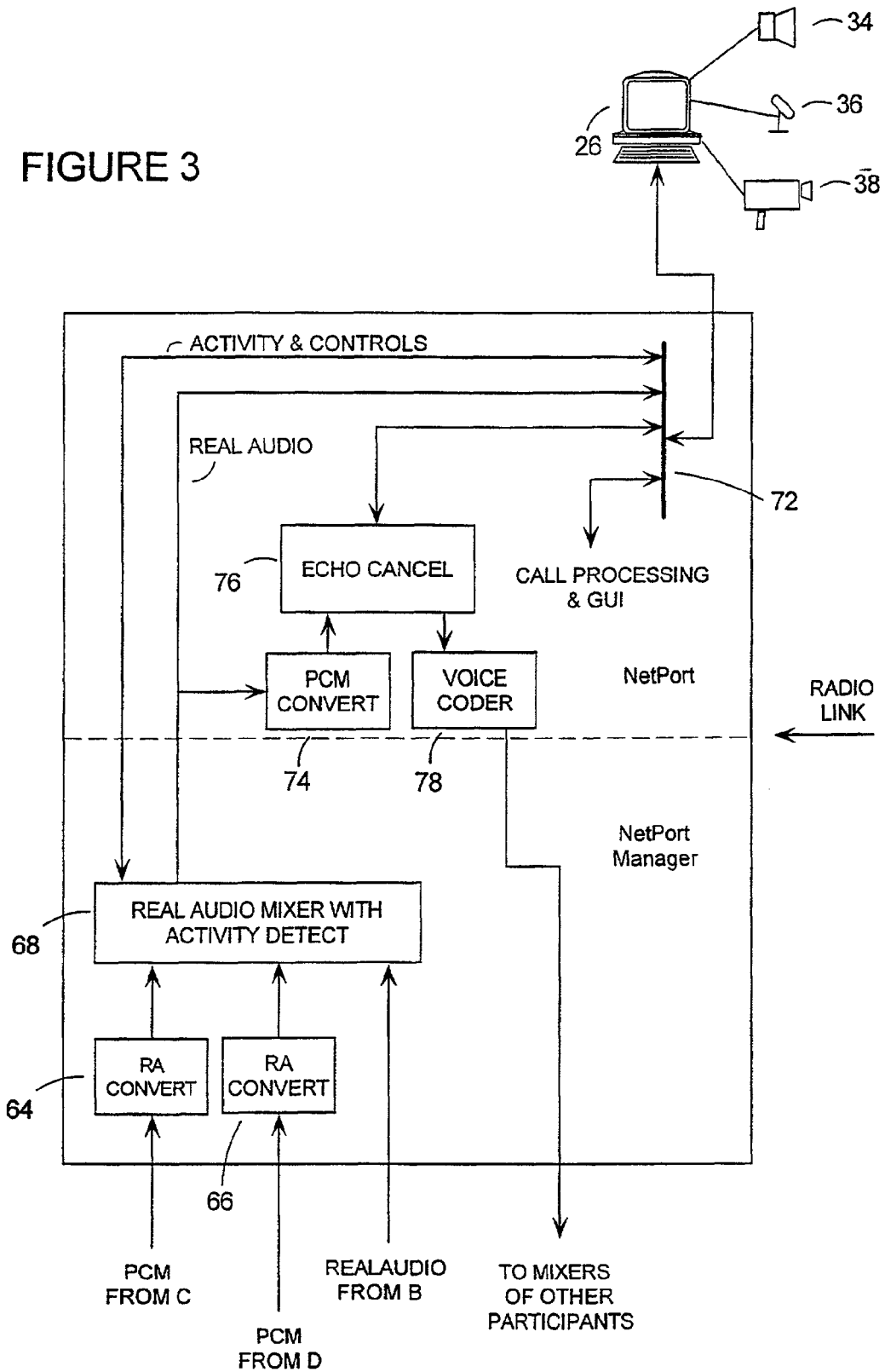
FIG. 3 presents a block diagram of exemplary signal processing software in a preferred embodiment of the invention.

As an example, exemplary signal processing software for participant A is presented as a block diagram in FIG. 3. Voice streams from other participants arrive in different forms and need to be converted to a consistent form, companded and then mixed. They also need to be transmitted across the radio link 30 in an efficient form, and other signal processing such as echo cancellation/suppression may need to be done on the voice data. In this case, RealAudio has been chosen as the consistent form though MP3 or a number of other forms could be used. RealAudio is particularly convenient as it is a real-time streaming standard that is well known in the industry and for which many tools are currently available, such as codecs and mixers. This type of processing is also required for the other listeners, and it takes slightly different forms for each participant which correlate to their respective setups.

Not shown in FIG. 3 are such functions as encryption, tone controls and level control, though their implementation follows logically from the description provided herein.

Specifically, pulse code modulated (PCM) voice streams are received from Participants C and D, which are connected to RealAudio converters 64 and 66. PCM is the standard transmission form for audio in the PSTN. Since the voice signal received from Participant B is already in RealAudio format, which comprises data packets and is easily transported over IP, it is not necessary to convert it before passing its signal to the RealAudio mixer 68.

The RealAudio mixer 68 combines the incoming audio signals in accordance with the participant's requirements. In FIG. 3, a bi-directional Activity and Controls line is shown which interfaces the RealAudio mixer 68 with the PC 26 via an Ethernet card 72. The audio output of the RealAudio mixer 68 goes to the Ethernet card 72 as well, and also to a PCM convertor 74.

This PCM convertor 74 feeds the echo cancellor 76 with an audio signal that more or less matches the output from the participant's speaker 34. This way, the echo cancellor 76 can remove the speaker output signal that is inadvertently picked up by the microphone 36. The PCM signal leaving the echo cancellor 76 is converted to RealAudio at the voice coder 78.

RealAudio packets are numbered sequentially to ensure that they are arranged in the proper order when they are decoded. Generally, it is not necessary to time stamp packets as the time delays are short, and the varied delays in data packets that result from their transport from different sources, or by different routes, will not generally be detectable by the participants. In fact, RealAudio may deliberately add a delay to the incoming signals by storing them in a buffer to absorb signal jitter. As the data is arriving in finite and distinct data packets, there will inevitably be some degree of jitter, so buffering is preferred. A buffer that causes 20 mSec-50 mSec delay is sufficient time to absorb the effects of jitter most of the time, and is not long enough to annoy the users to a great extent.

Also, note that all audio signals passing between NetPort 32 and NetPort Manager 33 are in RealAudio form, and not PCM. This makes the transport over the digital interconnection more convenient.

Other preferred aspects of the teleconference are outlined as follows:

1. Call Setup

The most important aspect of call setup is the identification of the participants, where they can be found and then of course, creating the connections. In the preferred embodiment, the teleconference will be created by one or more of the participants who are GUI-enabled. These participants will advise the network of the identities of the participants and the call setup software on the network will make the connection with the participants.

Some of the participants will have Internet addresses, while others will have telephone numbers. In each case, the call setup software will investigate the participant and establish the best possible connection that it is aware of. Those participants without Internet access will be assigned proxies which reflect the resources they have access to. For example, if the call setup software identifies a PSTN telephone number as the best connection, it will assign a PSTN proxy to that participant unless advised otherwise. In the preferred embodiment, all participants who are GUI-enabled can add participants to the call, but for high-security teleconferences, addition of participants should be controlled by a single participant.

2. Telecommunications Operating System

The telecommunications operating system aspect of the invention provides unified control and access to all system resources and networking links, with the functionality in and implied by FIG. 3. This represents a large collection of signal processing and control functions connected together in response to the commands of the callers.

This contrasts with the "pure Internet Protocol" approach which require cooperating tasks in all of the various computers to arrange to do their parts of the processing through an application-specific protocol built on socket( ) calls, with no single program having an overview of the whole setup. This makes it very difficult to optimize and manage the system, and each such application has to reinvent call processing. The invention uses socket( ) as part of the underlying implementation in a preferred embodiment, so that the invention is built as a middleware layer on top of IP.

In "telephony classic" one would not attempt to set up something with this generality in software, but would make special "stereo conferencing server" hardware that assumes all inputs and outputs are PCM and would add special numbers to call in order to connect to it. The need for specialized hardware makes this a "closed system", in which innovation is slowed down by limitations on who can develop new telecommunications applications.

3. Proxy

A proxy is a piece of software that acts on behalf of a specific party to a connection. In this case Participants A through D, and each of the networks and Internet providers are separate parties with separate proxies. A proxy contains data that represents the preferences and state of the party, such as whether Participant A is already on the telephone and whether the first active network's 28 voice trunk is getting full, and has components that are agents to do specific tasks, such as responding to off-hook on a telephone and managing a voice call in progress. The terms proxy and agent are sometimes used interchangeably in the art. For the purposes of this document, they are distinct: a proxy is built out of agents, each of which handles a special situation. Therefore, the proxy does not comprise an immense block of code with all conceivable functionality, but in its simplest form, is merely a supervisor which instantiates software agents as required, discarding them when their tasks have been completed.

These agents are sent to parts of the system in which signal processing is going on and are connected to the signal processing code or hardware through a "controlling application". This architecture of proxies, agents and controlling applications is what allows connection management applications to appreciate the whole structure of a connection while still being "owned" by several different parties.

Proxies should persist in the presence of component failures, so that, for example, a user's forwarding instructions do not get lost during a crash. It is preferred that persistence be provided via a distributed database which is continuously updated, so that all concerned parties are aware of the status of the communication. In the event of a failure, the system is able to work around the failure, allowing the communication to continue. Such transactional interaction techniques are known in the art.

In the "pure Internet Protocol" approach there is only custom software running on hardware belonging to the various parties involved and communicating through socket( ) mechanisms in an ad hoc protocol. The invention builds an additional structure on top of this.

In "telephony classic" there is a single very large program that looks at a database for all users and decides what they would want to do. This program is too large to modify quickly, and can only be modified by the equipment manufacturer. Again, this approach is not flexible enough for rapid evolution of new features. The architecture of the invention makes it easier to understand and modify software, without the same complexity, allowing the system to be open to software development, so that new features may be brought to market very quickly.

4. Graph

It is preferred that the invention be applied to a network which employs a graph model. Briefly, the graph model constructs the signal processing and communications structure as a mathematical graph, which is later implemented by taking "filters" that implement the nodes out of libraries and modifying them, either by a dynamic linking process or by setting the IP addresses to which they make socket connections, to have the interconnection structure specified by the edges. This graph is also used for communication among the agents, as the data structure that defines a connection. An API layer that describes characteristics of these graphs is added above the raw graph structure to assist in writing agents.

In addition to filters, it is also preferred that this graph data packet contain calls to proxy agents required to set up the call. Proxies may also send their agents to collaborate on building and managing graphs.

An application programming interface (API) converts a series of comparatively simple and high level functions into the lower level instructions necessary to execute those functions, simplifying use of an operating system. Using Windows APIs, for example, a program can open windows, files, and message boxes, as well as perform more complicated tasks, by executing single instructions.

The particulars of how an API for the invention is implemented are not critical, but it is desirable that a standard API be employed that expresses control, connection and negotiation processes, including payment. The use of a standard API simplifies the creation of new features by third parties.

A GUI is particularly well suited to the use of a graph model, as the GUI may present the assembled filters as defined by a graph data packet, to the user in a very logical and understandable form. It is also preferred that the GUI have the functionality to let the user modify the graph data packet simply by altering filters and their interconnections.

In the "pure Internet Protocol" approach the overall communications structure is not visible at all, while in the "telephony classic" approach it is possible for switch software to connect physical ports together, but not to pull functions out of libraries. The decision about what ports to connect together is explicitly made by the users by dialing telephone numbers in the "telephony classic" approach.

3. Real Time Operating System (RTOS)

Voice teleconferencing is a real time procedure, so RTOS should be used as known in the art. Generally, RTOS's divide code to be executed into smaller units of threads and functions, and then schedule the execution of these threads and functions to be performed prior to specific deadlines.

4. Distributed Operating System

Figure 4:
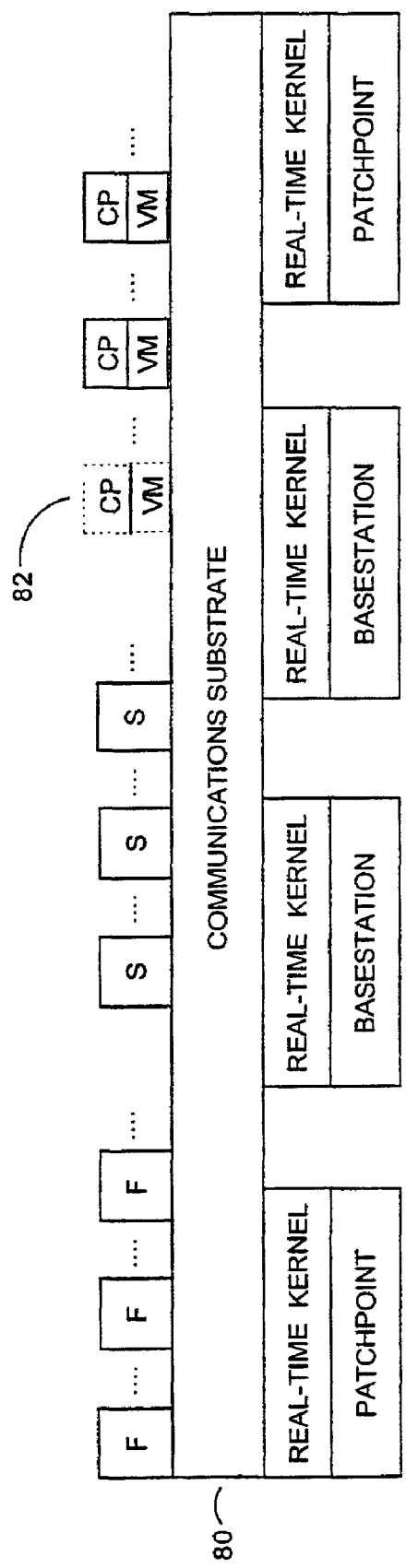
FIG. 4 presents a block diagram of an exemplary operating system architecture in a preferred embodiment of the invention.

A distributed operating system is one in which portions of the software can run on different nodes. In the case of a telecommunications system, distribution of software makes it easier to maintain real time operation as there are more options available to schedule timely execution. As well, distributed operation improves scalability and speed. The use of agents and proxies lends itself to the efficient use of a distributed system, in that agents and proxies may be assigned to run on different nodes of the system. Ideally, agents will be located close to where they are required, to minimize time delays in communicating with the entities they represent. FIG. 4 presents a block diagram of an exemplary operating system architecture in a preferred embodiment of the invention. A distributed communications substrate 80 is interposed between user processes and the underlying machines, so that processes can generally be moved from one machine to another without being aware of it, either to distribute load or to recover from failures.

Processes running in the system come from different sources and accordingly get different treatment in terms of the trade-off between security and performance. Call-processing functions acting on behalf of the end users run in a protected "sandbox" environment on a virtual machine. Those working on behalf of the network provider may run there, but may also be implemented directly as processes running on the network operating system. User processes running as "filters", with the hard real-time demands that come from being in the signal path, and also run directly on the communications substrate 80. Processes belonging to different users are protected from each other by the usual operating system mechanisms such as memory mapping and file privileges, but the source is also reviewed by the network administrator. Filter processes on the same machine and part of the same call may share an address space and a thread of control, with data being passed with a function call mechanism and with connections to other hardware being handled by a stub that adapts a function call to a socket-type mechanism. These filters would still be dynamically linked, even with the function-call mechanism.

Signals pass through filter processes F, which also implement drivers and performance-sensitive functions on behalf of the network. Call processing on behalf of users is handled by CP processes running in a secure virtual machine VM environment, which also includes checkpointing functions that can transfer control on failure to a "ghost machine" 82. All these processes run on the common software communications layer 80, which places them on appropriate physical systems and arranges for their connections. Server processes S also run on the communications substrate 80, but do not have the hard real-time constraints of the filter processes. Secure call-processing functions are one type of server process.

5. Mapper

The allocation of tasks and network capacity to different communications graphs is done by an optimizer called the mapper. There are in general many ways that a graph representing a desired communication can be allocated to a physical network: each of the filters can run on several different nodes, for example, and sometimes there are several types of links over which data can be carried. The simplest embodiment uses hints from the proxies about where to put radio links, that is, after the voice coder, and then applies a "greedy algorithm" to put computing resources as close to the network edge as possible. A good mapper should be a distributed application in which local decisions are made with local knowledge to the greatest extent possible. It is not essential to get a global optimum, as long as resources are not seriously wasted.

In the case of the invention, the most significant resource management problem is the handling of the voice streams. In having a separate mixer for each of N participants, each mixer will receive (N−1) voice streams. The mapper must balance the benefit of distributing the mixers among various processors against the extra cost of transporting redundant audio signals. The factor that governs these decision in the implementation of the invention is quality of service (QoS). Methods of distributing such real time loads are known in the art, but in the case of the invention, the solution will vary with each set of participants and network topography.

6. Negotiation

It is preferred that the architecture for agents provide for use of a negotiation system Many users are competing at once for the shared resources of the network (including its computing capacity). It is preferred to apply a market model to resolve this contention: agents for the parties involved offer and demand payment as part of connection setup, and a connection does not happen until all parties have accepted it. A caller can choose to try a connection at a reduced quality level if the cost of the high quality connection becomes too high. For example, on Christmas Day, the load may be temporarily high, so users can expect to get through with reduced voice quality rather than getting a busy signal.

In "pure Internet Protocol", temporary congestion is resolved on a "best efforts" basis and packets may be almost arbitrarily thrown out, and at a longer time-scale by overprovisioning the network so that failures are not too frequent. With differential service a small number of priority classes are defined, but the definition needs to be managed. The market model of the invention can be used to manage differential service, allocating high priority access in such a way as to permit guarantees on service.

In "telephony classic" contention is managed by call admission (first-come, first served) and again the network is over-provisioned so that failures are not too frequent.

Negotiation management may be implemented by having a negotiation agent for each of the user terminals and for each of the multiple telecommunications networks. Each negotiation agents is operable to execute somewhere on the telecommunications system, for example, on the active network, and represents the interests of its respective party in negotiating communication over the telecommunications network. This is done by identify participants in the negotiation and then passing a graph data packet which describe the proposed connection, to each participant for their consideration. Each negotiation agent may either accept, reject or revise it to make a new proposal to the other negotiation agents.

When all or part of the graph data packet is to be executed, a device simply assembles the listed filters in the manner defined in the graph data packet.

It is also preferred that the invention be implemented with a strong security mechanism that protects proxies from erroneous or malicious code in other proxies. As well, it is presently desirable that proxies and agents be written in Java™, but another language with similar advantages could also be used. Advantages of Java™ include:

a. excellent security
 b. a large community of experienced developers
 c. object oriented code structure
 d. simple net-based distribution mechanism A telecommunications system implemented with the functionality described above provides a foundation for the mixed media applications of the future, and for greater flexibility and power to existing services such as high bandwidth telephone, and Internet gaming.

Other options for implementation of the invention include:

1. Companding

Companding techniques use "compression" algorithms that try to adjust gains (smoothly) so as to keep a signal's level more constant and "expansion" algorithms that adjust gains to exaggerate signal-level variations. Some techniques used in audio are frequency-dependent, such as Dolby companding which adjusts filter cutoffs to suppress background hiss when signal levels are low.

An extreme example of expansion is "squelch" in which signals with power level below a certain threshold are turned off completely to minimize idling noise. In telephony the most common variant is "echo suppression", as opposed to "cancellation", in which the signal path from the quieter user has its gain reduced, which reduces the loop gain for echoing and feedback oscillation. Companders use around 5-50 operations per sample. Instantaneous companders work on a sample-by-sample basis, and the common A-law case is covered under "coders" below.

2. Voice Coding

Voice coders are used to reduce the bandwidth requirements for voice signals. There are many types, but broadly they can act on the waveform, minimizing some mathematical measure like error power; they can model the source; or they can model what the ear will notice. Coding for compression is an active research area, and a steady stream of new coders is likely to appear.

"Telephony classic" uses waveform coding in the form of 8 kHz A-law (or µ-law). Sampling is done at 8 kHz on a signal filtered to pass the range from 300 Hz to 3300 Hz. The passband was defined to get good subjective scores on speech quality and intelligibility, and the sample rate is designed with a 33% margin over the Nyquist minimum in a trade-off between network and prefilter costs. A-law and µ-law are specialized 8-bit floating-point representations, chosen as a way to get roughly constant signal-to-noise over a wide range of signal levels. By comparison, compact disc (CD) sound is stereo 16-bit fixed-point sampled at 44.1 kHz, which requires roughly 24 times the bandwidth and the use of a T1 line. Because speech varies slowly from sample to sample, the same quality can be had for roughly half the bandwidth with ADPCM (adaptive differential pulse-code modulation) which, roughly speaking, digitizes the derivative instead.

Most digital cell-phones use a variant of linear prediction coding, which tries to model the incoming sound in terms of a sound source that simulates the vocal cords or airflow and which in turn drives a filter that models the larynx. This requires less bandwidth than waveform coding because the larynx moves more slowly than the waveform, but works badly for anything other than speech or even for speech in a noisy environment. These "source coders" are an active topic of research and currently produce tolerable speech at output rates anywhere from 4 kb/s up. A typical modern coder uses about 50 MIPs of DSP capacity. Coders typically operate on 20 msec frames of data, and hence add at least that much delay to the signal path.

Source coders typically try to detect silence, and avoiding the transmission of silence typically saves about 50% of bandwidth on average. At the decoding side it is conventional to replace silence with "comfort noise" so that the listeners know the connection is still live.

Source coding is difficult to use for music, because it would be necessary to model a large number of different instruments alone and in combination, so early digital audio such as CD and DAT, just used waveform coding with enough bandwidth and dynamic range to satisfy (more or less) the human ear. Minidisc and digital compact cassettes brought in coding that reduced CD bandwidth by a factor of about 10 by using psychoacoustics. Psychoacoustics applies, in particular, masking effects, where loud tones mask nearby ones for normal ears, and bandwidth can be saved by not transmitting the inaudible components. This type of technique can also be rate-adapted, as in RealAudio, and is a good candidate for high-quality speech applications in the system of the invention.

Conventional filters, companders and similar components will not work on a coded signal, so it is standard to decompress before filtering. In some cases this may be avoided, for example, N-way combining can take advantage of silence to do companding at no additional cost of bandwidth, and only needs to decode and recode during bi-directional conversation.

3. MPEG (Motion Picture Experts Group)

MPEG coders do the same type of thing for video signals that perceptual coders do for music. Components of a video stream at high spatial frequencies are digitized at low resolution, using 8*8 discrete cosine transforms to do the filtering, and using "motion estimation" so that components of an image that can be derived from adjacent frames are not retransmitted. MPEG decoding is preferably left for the end-user's PC, because it is very demanding and because specialized hardware exists for it. However, the traffic properties are an important consideration in implementing the invention. Straight digitized television requires roughly 30 frames/sec*200 kpixels/frame*3 colours*8 bits/colour, for 144 Mb/s. That is beyond what 3G wireless is built to handle, but MPEG2 gives similar quality at 2 Mb/s; hence the 3G requirement for that rate. MPEG2 is also bursty, needing more capacity when the image changes suddenly.

At the low-quality end, videoconferencing is usually done at 128 kb/s. At this rate the coding process adds hundreds of msec of delay and the picture is poor.

If there is high demand for full-motion video, then 5 MHz slots will not have sufficient capacity, but 20 MHz slots and generous use of antenna diversity could support 10-40 users at that rate.

The network operating system could initiate processes in the end-user's PC so that video services can be set up easily.

4. Other Applications

Other applications such as animated video, stereo input at the participant's locations, voice activation, automatic gain control (AGC) at the user's PC, and signal shaping to compensate for the frequency response of certain devices or software in the system, are all known in the art, and easily applied to the invention.

Examples have been shown to demonstrate various aspects of the invention, but the number of variations is by no means complete. Comparable implementations could be made for any telephony device, including personal digital assistants, fax machines, pagers, point of sale computers, amateur radios, local area networks or private branch exchanges. While particular embodiments of the present invention have been shown and described, it is clear that changes and modifications may be made to such embodiments without departing from the true scope and spirit of the invention as defined by the attached claims.

The invention could also be implemented to a lesser extent on existing Internet and PSTN networks. For example, Internet servers could be given much of the functionality of the invention similar to applications such as NetMeeting™. On the PSTN a specialized server could be attached to a class 5 switch. These implementations would not have all the benefits of the invention, but could apply certain aspects of its teachings.

The method steps of the invention may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes, CD-Roms, Random Access Memory (RAM), Read Only Memory (ROM) or similar computer software storage media known in the art, may be programmed to execute such method steps. As well, electronic signals representing these method steps may also be transmitted via a communication network.

It would also be clear to one skilled in the art that this invention need not be limited to the described scope of computers and computer systems. The principles of the invention could be applied to citizen's band radio, amateur radio, or packet radio. Again, such implementations would be clear to one skilled in the art, and do not take away from the invention.

What is claimed is:

1. A system for teleconferencing comprising:
   three or more user terminals, each having an audio input and an audio output;
   a telecommunications network interconnecting said user terminals and operable to transport data to and from said user terminals;
   separate modular mixing software for each respective user terminal, executing on said telecommunications network, and operable:
     to receive separate audio signals from said audio outputs of the others of said user terminals; and
     to combine said separate audio signals into a signal for said audio input of said respective user terminal which correlates to the needs of said respective user terminal;
   modular connection management software for establishing interconnections between said three or more user terminals and said separate modular mixing software, including a connection proxy for each of said three or more user terminals and said telecommunications network; and
   each of said connection proxies executing on said system and being operable:
     to represent its owner's interests in managing the teleconference by recognizing the limitations of its owner's resources.

2. A system as claimed in claim 1, further comprising:
   a mapper for locating said separate modular mixing software for each respective user terminal for execution on different routers of said telecommunications network, trading off delay time in communicating data between routers with computational power available in order to maintain quality of service.

3. A system as claimed in claim 2, wherein said telecommunications network comprises multiple telecommunications networks with varied transport media and protocols, each of said multiple telecommunications networks having its own connection proxy.

4. A system as claimed in claim 3, further comprising:
   negotiation management software including a negotiation agent for each of said user terminals and said multiple telecommunications networks, each of said negotiation agents being operable:
     to execute on said system; and
     to representing the interests of each of said three or more user terminals in negotiating communication over said telecommunications network;
   said negotiation management software being operable:
     to identify negotiation agents participating in a negotiation;
     to implement a negotiation discipline which allows each said participating negotiation agent to consider a communication contract and either accept or revise said communication contract; and
     to respond to said negotiation being successful by executing said communication contract.

5. A system as claimed in claim 4, wherein said separate modular mixing software is operable to combine said separate signals into two or more audio channels which define a metaphorical physical space, each user terminal having a simulated position within said metaphorical physical space whereby individual users may be recognized by their particular position in said space.

6. A system as claimed in claim 5, wherein said mixer is responsive to a request from said respective user to emphasize a particular user's voice by amplifying the corresponding audio signal prior to combining.

7. A system as claimed in claim 6, wherein at least one of said user terminals comprises a personal computer having a stereo sound card and stereophonic speakers, and said respective mixer software is operable to combine said separate signals into two audio channels.

8. A system as claimed in claim 7, wherein at least one of said user terminals comprises a connection to a PSTN network via two monophonic telephone lines, and said respective mixer software is operable to combine said separate signals into two audio channels.

9. A system as claimed in claim 8, wherein each said connection proxy comprises:
multiple software agents each being operable to perform a specific task; and
a proxy object operable to instantiate particular ones of said multiple software agents in response to requirements of communications made over said telecommunications system.

10. A server for teleconferencing comprising:
means for interconnecting user terminals and transporting data to and from said user terminals;
means for executing separate modular mixing software for each respective user terminal, said separate modular mixing software including:
means for receiving separate audio signals from said audio outputs of the others of said user terminals;
means for combining said separate audio signals into a signal for said audio input of said respective user terminal which correlates to the needs of said respective user terminal; and
means for executing modular connection management software for establishing interconnections between said user terminals and said separate modular mixing software, said modular connection management software including a connection proxy for each of said user terminals and said means for interconnecting user terminals and each of said connection proxies representing its owner's interests in managing the teleconferencing by recognizing the limitations of its owner's resources.

11. A method of teleconferencing comprising the steps of:
receiving, at a separate modular mixer representing a respective one of three or more user terminals and executing on a telecommunications network, separate audio signals from audio outputs of the others of said user terminals;
executing modular connection management software on said telecommunications network for establishing interconnections between said three or more user terminals and said separate modular mixers, said modular connection management software including a connection proxy for each of said three or more user terminals and said telecommunications network, each of said connection proxies being operable to represent its owner's interests in managing the teleconferencing by recognizing the limitations of its owner's resources; and
combining said separate audio signals into a signal for an audio input of said respective user terminal which correlates to the needs of said respective user terminal.

12. A computer data signal embodied in a carrier wave, said computer data signal comprising a set of machine executable code being executable by a computer to perform the steps of claim 11.

13. A computer readable storage medium storing a set of machine executable code, said set of machine executable code being executable by a computer server to perform the steps of claim 11.

* * * * *